US012757870B2

(12) United States Patent
Xu et al.

(10) Patent No.: US 12,757,870 B2
(45) Date of Patent: Oct. 13, 2026

(54) PET OUTDOOR WATER DISPENSER AND FEEDER WITH DOUBLE-ENDED THREADS

(71) Applicant: GUANGDONG SUPER TECHNOLOGY CO., LTD, Zhongshan City (CN)

(72) Inventors: Yusheng Xu, Zhongshan City (CN); Tianle Yang, Zhongshan City (CN); Yibao Zeng, Zhongshan City (CN)

(73) Assignee: GUANGDONG SUPER TECHNOLOGY CO., LTD, Zhongshan City (CN)

( * ) Notice: Subject to any disclaimer, the term of this patent is extended or adjusted under 35 U.S.C. 154(b) by 0 days.

(21) Appl. No.: 19/026,792

(22) Filed: Jan. 17, 2025

(65) Prior Publication Data

US 2026/0041059 A1 Feb. 12, 2026

(30) Foreign Application Priority Data

Aug. 9, 2024 (CN) ........................ 202411092220.1

(51) Int. Cl.
*A01K 7/06* (2006.01)

(52) U.S. Cl.
CPC ..................................... *A01K 7/06* (2013.01)

(58) Field of Classification Search
CPC ........................................................ A01K 7/06
See application file for complete search history.

(56) References Cited

U.S. PATENT DOCUMENTS 2,726,636 A * 12/1955 Frederiksen ............. A01K 7/06 222/445
5,924,678 A * 7/1999 Olde ........................ A01K 7/06 251/348
6,293,226 B1 * 9/2001 Hwang .................... A01K 7/06 222/545
6,786,180 B1 * 9/2004 Cheng ...................... A01K 7/06 119/72.5

(Continued)

FOREIGN PATENT DOCUMENTS

CN 110839543 A 2/2020

OTHER PUBLICATIONS

Translation of BR_MU9000626_U2 (Year: 2011).*
Translation of CN 204499059 U (Year: 2015).*

*Primary Examiner* — Timothy D Collins
*Assistant Examiner* — Brittany A Lowery
(74) *Attorney, Agent, or Firm* — Rondaus PLLC; George Liu

(57) ABSTRACT

Disclosed is a pet outdoor water dispenser and feeder with double-ended threads. The pet outdoor water dispenser and feeder in the present disclosure comprises a bottle body, a bottle cap and a bowl body, a bottle opening of the bottle body is provided with an outer thread, the bottle cap is divided into an upper cap and a lower cap, the upper cap and the lower cap are both provided with inner threads, the upper cap and the lower cap are separated through a partition plate, the partition plate is provided with a water outlet hole and a movable sealing piece, and the bottle cap is further fixedly connected to the bowl body. When in use, the lower cap can be screwed onto the bottle opening, and the movable sealing piece can move relative to the partition plate under the pressure of water to open the water outlet hole.

8 Claims, 7 Drawing Sheets

(56) References Cited

U.S. PATENT DOCUMENTS

| | | | | |
|---|---|---|---|---|
| 7,117,818 | B2 * | 10/2006 | Pappas | A01K 1/0356<br>215/337 |
| 8,464,660 | B2 * | 6/2013 | Valeriano | A01K 7/06<br>119/72 |
| 8,591,134 | B2 * | 11/2013 | Cahill | A01K 7/00<br>401/219 |
| 9,894,879 | B2 * | 2/2018 | Sanderson | A01K 7/00 |
| 2007/0017452 | A1 * | 1/2007 | Hurwitz | A01K 7/00<br>119/74 |
| 2008/0087224 | A1 * | 4/2008 | Wechsler | A01K 7/00<br>119/52.1 |
| 2009/0159009 | A1 * | 6/2009 | Parks | A01K 7/00<br>119/74 |
| 2012/0318201 | A1 * | 12/2012 | Sanders | A01K 7/06<br>119/72 |
| 2017/0071150 | A1 * | 3/2017 | Abbey | A01K 7/00 |
| 2017/0245466 | A1 * | 8/2017 | Adams | A01K 7/06 |
| 2019/0216052 | A1 * | 7/2019 | Yang | A01K 7/00 |
| 2019/0320615 | A1 * | 10/2019 | Cheng | A01K 7/06 |
| 2022/0000069 | A1 * | 1/2022 | Yang | A01K 7/00 |

* cited by examiner

PET OUTDOOR WATER DISPENSER AND FEEDER WITH DOUBLE-ENDED THREADS

CROSS-REFERENCE TO RELATED APPLICATIONS

This application claims priority to Chinese Patent Application No. 202411092220.1, filed on Aug. 9, 2024, which is incorporated herein by reference in its entirety.

TECHNICAL FIELD

The present disclosure relates to the technical field of pet supplies, in particular to a pet outdoor water dispenser and feeder with double-ended threads.

BACKGROUND

With the progress of the times and the improvement of people's living standards, more and more families are keeping pets, and the ways of pet care have also undergone changes. Traditionally, pets were provided with water or other liquids by placing containers filled with them at specific locations, allowing pets to lick or use water dispensers connected to water pipes for sucking. However, nowadays, pets are not just confined to homes; they accompany their human friends in various settings. When engaging in outdoor activities, it is necessary to provide pets with food and clean drinking water, which often requires carrying various water bottles and the like. Obviously, it is quite inconvenient to provide water for pets outdoors in this manner.

SUMMARY

In order to achieve the above object, the present disclosure provides a pet outdoor water dispenser and feeder with double-ended threads, comprising:

- a bottle body, wherein a bottle opening of the bottle body is provided with an outer thread;
- a bottle cap, wherein the bottle cap comprises an upper cap and a lower cap, a partition plate is arranged between the upper cap and the lower cap, the partition plate is provided with a water outlet hole, the partition plate is provided with a movable sealing piece on one side of the upper cap, the movable sealing piece is used for opening or sealing the water outlet hole, and an inner thread is provided on an inner side of the upper cap and an inner side of the lower cap; and
- a bowl body, wherein the bowl body is fixedly connected to the upper cap, and the bowl body is used for collecting water flowing out from the water outlet hole in the bottle body.

In some possible embodiments, the movable sealing piece is made of an elastic soft rubber material, one end of the movable sealing piece is fixedly connected to the partition plate, another end of the movable sealing piece is a free end, and the free end always has a tendency to be tightly attached to the partition plate to cover the water outlet hole.

In some possible embodiments, the partition plate is provided with a protruding fixing block on one side of the upper cap, a mounting slot is formed between the fixing block and the partition plate, and one end of the movable sealing piece is fixedly inserted into the mounting slot.

In some possible embodiments, the movable sealing piece is provided with a handle on one side of the upper cap.

In some possible embodiments, the bowl body comprises a hard portion and a soft portion, a crease line is provided at a connection between the hard portion and the soft portion, and the soft portion is arranged to be folded along the crease line and is tightly attached to an inner surface of the hard portion.

In some possible embodiments, the hard portion comprises a first water storage portion and a second water storage portion that communicate with each other, and an inner diameter of the second water storage portion is greater than an inner diameter of the first water storage portion.

In some possible embodiments, the hard portion is integrally formed with the bottle cap.

In some possible embodiments, a low-lying water collecting groove is formed on an inner side of the second water storage portion.

In some possible embodiments, the pet outdoor water dispenser and feeder with double-ended threads further comprises a licking ball, the licking ball is connected to the movable sealing piece via a connecting rope, the licking ball is arranged to be placed in the bottle body or the bowl body, and pet licks or pulls the licking ball, thereby pulling the movable sealing piece to open the water outlet hole.

In some possible embodiments, the licking ball is divided into two detachably connected hemispheres, the licking ball is provided with a cavity for holding food, and a surface of the licking ball is provided with a through hole that communicates with the cavity.

In some possible embodiments, a plurality of protrusions are formed on the surface of the licking ball.

Compared with the prior art, the beneficial effects of the present disclosure are as follows: The pet outdoor water dispenser and feeder in the present disclosure comprises a bottle body, a bottle cap and a bowl body, a bottle opening of the bottle body is provided with an outer thread, the bottle cap is divided into an upper cap and a lower cap, the upper cap and the lower cap are both provided with inner threads, the upper cap and the lower cap are separated through a partition plate, the partition plate is provided with a water outlet hole and a movable sealing piece, and the bottle cap is further fixedly connected to the bowl body. When in use, the lower cap can be screwed onto the bottle opening, and the movable sealing piece can move relative to the partition plate under the pressure of water to open the water outlet hole. By tilting the bottle body, water inside can flow out through the water outlet hole and be stored in the bowl body for pets to drink or eat. The water remaining in the bowl body can also flow back into the bottle body. Then, the upper cap can be screwed onto the bottle opening to prevent the movable sealing piece from moving, thereby ensuring that the movable sealing piece seals the water outlet hole. The design is ingenious and convenient to use.

BRIEF DESCRIPTION OF THE DRAWINGS

In order to more clearly illustrate the technical solutions in the embodiments of the present disclosure, the drawings needed to be used in the description of the embodiments will be briefly introduced below. Obviously, the drawings in the following description are only some embodiments of the present disclosure, and for a person of ordinary skill in the art, other drawings can also be obtained based on these drawings without exerting creative efforts.

DETAILED DESCRIPTION OF THE EMBODIMENTS

Figure 1:
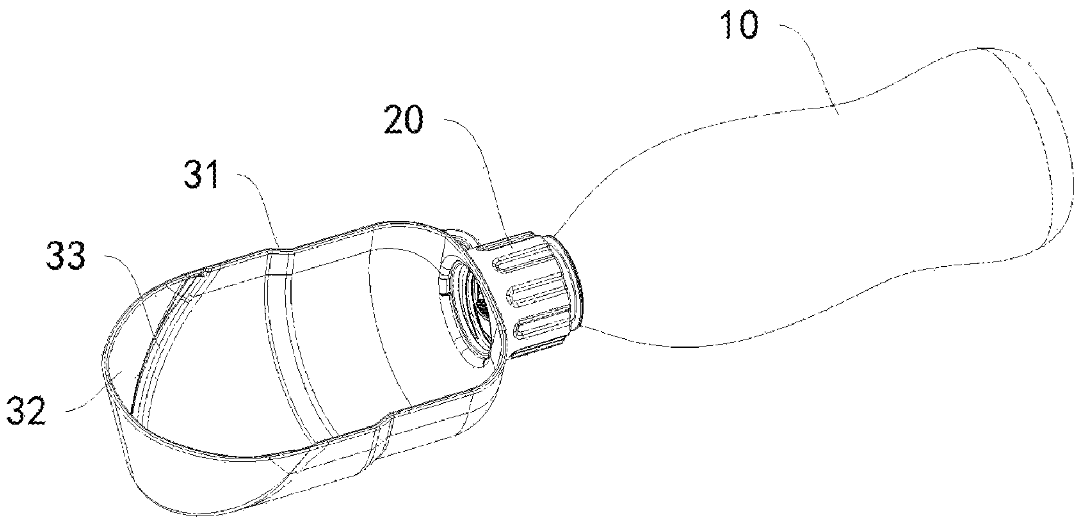
FIG. 1 is a three-dimensional structural diagram showing the usage state of a pet outdoor water dispenser and feeder according to an embodiment of the present disclosure.
Figure 2:
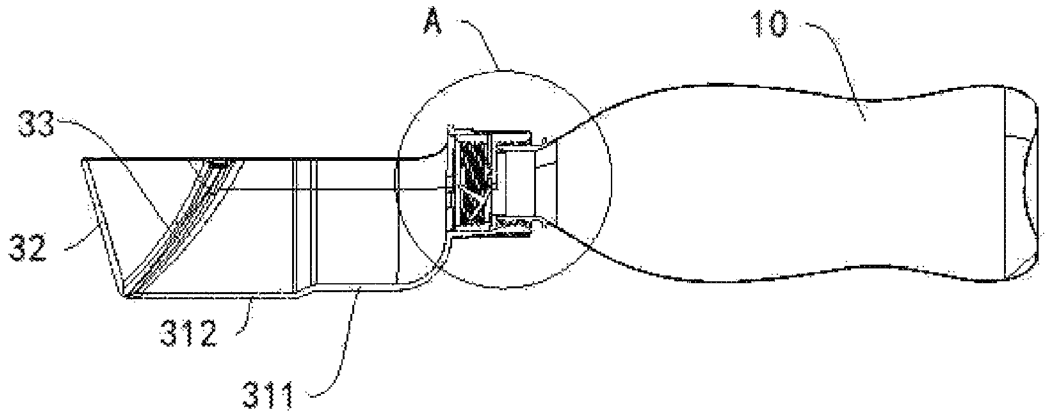
FIG. 2 is a front view structural diagram showing the usage state of a pet outdoor water dispenser and feeder according to an embodiment of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative efforts fall within the scope of protection of the present disclosure.

Hereinafter, the terms "first" and "second" are used for descriptive purposes only and cannot be understood as indicating or implying relative importance or implicitly indicating the quantity of indicated technical features. Therefore, features defined as "first" and "second" may explicitly or implicitly include one or more of these features. In the description of the embodiments of the present disclosure, unless otherwise specified, "a plurality of" means two or more.

Referring to FIGS. 1 to 6, a pet outdoor water dispenser and feeder with double-ended threads is shown, which comprises a bottle body 10, a bottle cap 20 and a bowl body 30, a bottle opening of the bottle body 10 is provided with an outer thread 11, the bottle cap 20 comprises an upper cap 21 and a lower cap 22, and the upper cap 21 and the lower cap 22 are each provided with an inner thread 26 matched with the outer thread 11. In this embodiment, the bottle body 10 can adopt commonly used and easily purchasable water bottles on the market. Both the inner thread 26 and the outer thread 11 designed on the bottle cap 20 adopt standard threading, meaning that the bottle cap 20 in the present disclosure can fit commonly used water bottles on the market. The upper cap 21 and the lower cap 22 are separated through a partition plate 23. The partition plate 23 is provided with a water outlet hole 24, and the partition plate 23 is provided with a movable sealing piece 25 on one side of the upper cap 21. In its normal state, the movable sealing piece 25 can automatically cover the water outlet hole 24, and when the lower cap 22 is screwed onto the bottle opening, the partition plate 23 and the upper end face of the bottle opening can jointly compress the movable sealing piece 25 to achieve sealing of the water outlet hole 24. The bowl body 30 is fixedly connected to the upper cap 21 and located on one side of the upper cap 21. In the storage state, the lower cap 22 is screwed onto the bottle opening to seal the bottle opening, and the water outlet hole 24 is sealed by the movable sealing piece 25. At this time, the bowl body 30 can also be stored on the side face of the bottle body 10, effectively saving storage space and facilitating portability. When using, the bottle cap 20 is unscrewed, and the upper cap 21 is screwed onto the bottle opening. At this point, the movable sealing piece 25 can move relative to the partition plate 23 under water pressure to open the water outlet hole 24, allowing water from the bottle body 10 to flow into the bowl body 30 from the water outlet hole 24 for pets to drink or eat. Of course, it is also possible not to open the movable sealing piece 25 at this time. In this case, the bowl body 30 can serve as a container for holding food for pets to eat, or the bowl body 30 can be used to collect water from lakes or rivers outdoors.

Figure 3:
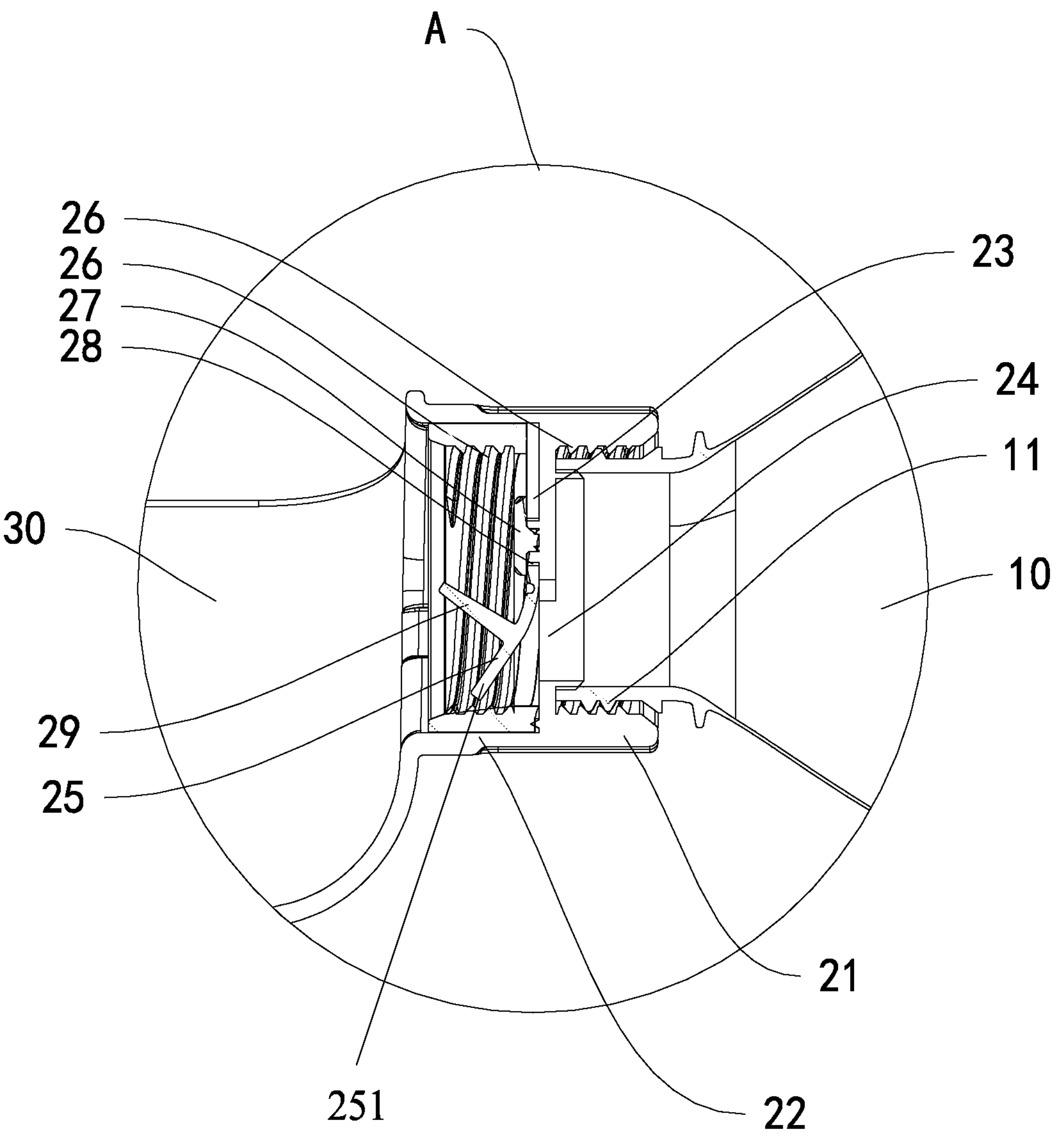
FIG. 3 is an enlarged schematic diagram of Section A in FIG. 2.
Figure 4:
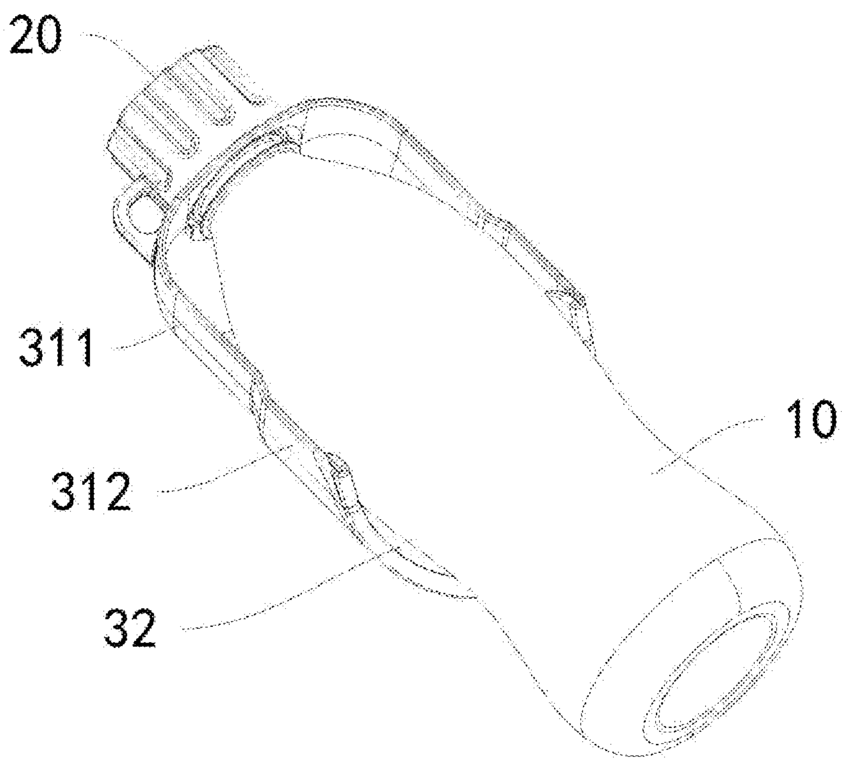
FIG. 4 is a three-dimensional structure diagram showing the storage state of a pet outdoor water dispenser and feeder according to an embodiment of the present disclosure.
Figure 5:
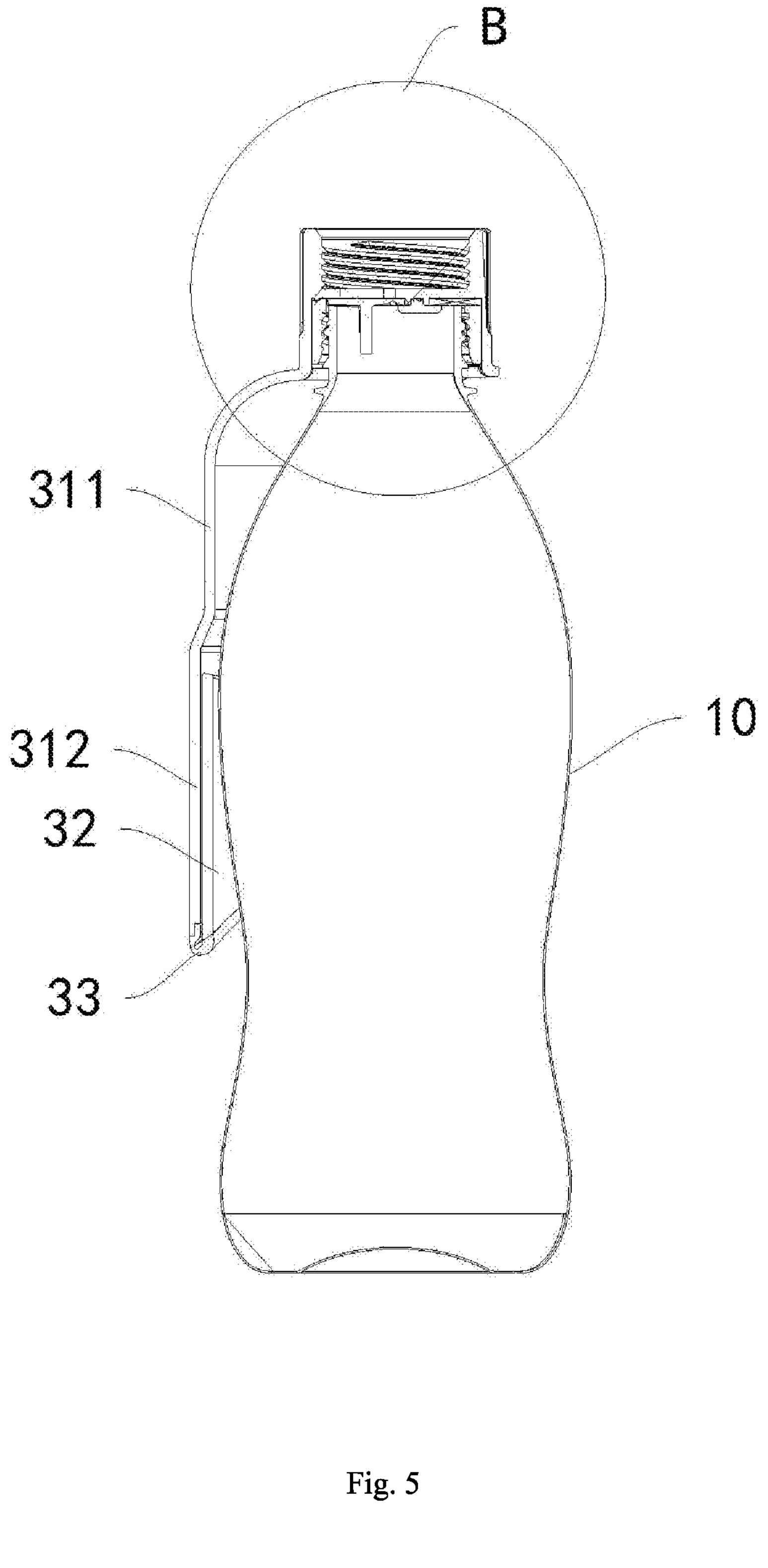
FIG. 5 is a front view structural diagram showing the storage state of a pet outdoor water dispenser and feeder according to an embodiment of the present disclosure.
Figure 6:
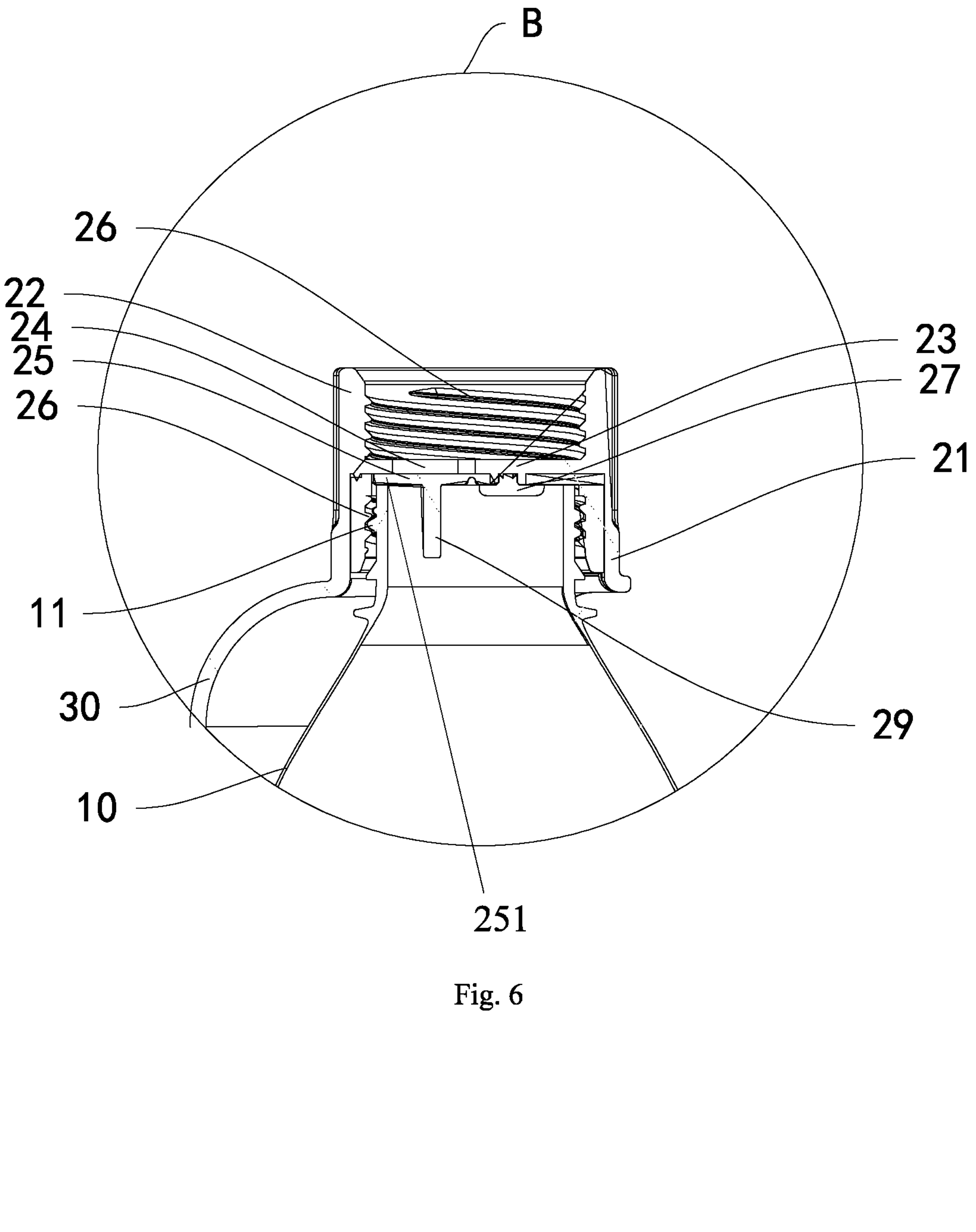
FIG. 6 is an enlarged schematic diagram of Section B in FIG. 5.

In some possible embodiments, referring to FIGS. 3 and 6, the movable sealing piece 25 is made of an elastic soft rubber material. When the lower cap 22 is screwed on, the partition plate 23 and the upper end face of the bottle opening jointly compress the elastic movable sealing piece 25 to ensure a tight seal around the water outlet hole 24. One end of the movable sealing piece 25 is fixedly connected to the partition plate 23, another end of the movable sealing piece 25 is a free end 251. The free end 251 extends to closely cover and seal the water outlet hole 24 on the partition plate 23. Due to the material's inherent elastic restoring force, the free end 251 of the movable sealing piece 25 can, in its natural state (i.e., when no external force is applied), completely cover and remain tightly adhered to the partition plate 23, thereby covering and sealing the water outlet hole 24. This design also prevents the movable sealing piece 25 from warping, which could lead to a lack of tightness when screwing on the lower cap 22.

In some possible embodiments, as shown in FIGS. 3 and 6, the partition plate 23 is provided with a protruding fixing block 27 on one side of the upper cap 21. This fixing block 27 can be fixedly connected to the partition plate 23 through laser welding, adhesion, or integral molding. A mounting slot 28 is formed between the fixing block 27 and the partition plate 23, and the opening of the mounting slot 28 oriented radially towards the center of the partition plate 23. One end of the movable sealing piece 25 is fixedly inserted into the mounting slot 28, and the other end is the free end 251, which extends to completely cover the water outlet hole 24. Furthermore, the free end 251 extends to cover the upper end face of the bottle opening, so that when the lower cap 22 is screwed onto the bottle opening, the partition plate 23 can compress and seal the free end 251.

In some possible embodiments, as shown in FIGS. 3 and 6, the movable sealing piece 25 is provided with a handle 29 on one side of the upper cap 21. During use, the handle 29 can be operated by hand to drive the movable sealing piece 25 and open the water outlet hole 24, allowing water to flow into the bottle body 10 through the water outlet hole 24.

In some possible embodiments, as shown in FIGS. 1, 2, 3, 5, 6, 7 and 8, the bowl body 30 comprises a hard portion 31 and a soft portion 32. The hard portion 31 and the soft portion 32 are connected in a sealed mode, and a crease line 33 is provided at a connection between the hard portion 31 and the soft portion 32. The soft portion 32 can be folded along the crease line 33 and is tightly attached to an inner surface of the hard portion 31. Therefore, in the storage state, the bowl body 30 can be accommodated on the side face of the bottle body 10, saving storage space and facilitating portability and storage.

In some possible embodiments, as shown in FIGS. 4, 5, 7 and 8, the hard portion 31 comprises a first water storage portion 311 and a second water storage portion 312 that communicate with each other. The first water storage portion 311 is fixedly connected to the outer side of the upper cap 21, the proximal end of the second water storage portion 312 is integrally formed with the first water storage portion 311, and the distal end of the second water storage portion 312 is connected to the soft portion 32 in a sealed mode. An inner diameter of the second water storage portion 312 is greater than an inner diameter of the first water storage portion 311, meaning that space is reserved inside the second water storage portion 312 to accommodate the soft portion 32.

Figure 7:
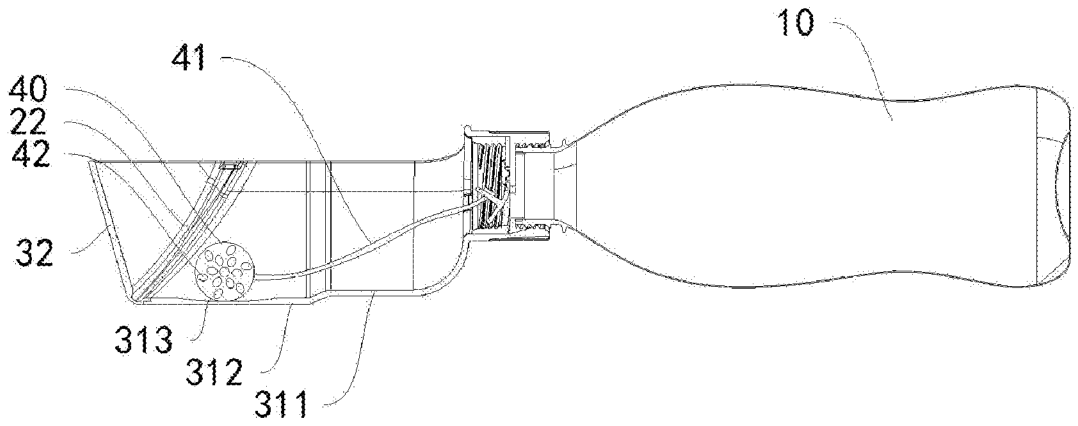
FIG. 7 is a front view structural diagram showing the usage state of a pet outdoor water dispenser and feeder according to another embodiment of the present disclosure.

In some possible embodiments, with reference to FIG. 7, a low-lying water collecting groove 313 is formed on an inner side of the second water storage portion 312. This design allows any remaining water in the bowl body 30 to collect in the low-lying water collecting groove 313, making it easier for pets to drink it all, thereby avoiding wastage or contamination of the water in the bottle body 10 if the water were to be recycled. Additionally, when feeding small amounts of food, the food can be concentrated in the water collecting groove 313, making it convenient for pets to lick it up.

In some possible embodiments, the hard portion 31 is integrally formed with the bottle cap 20.

Figure 8:
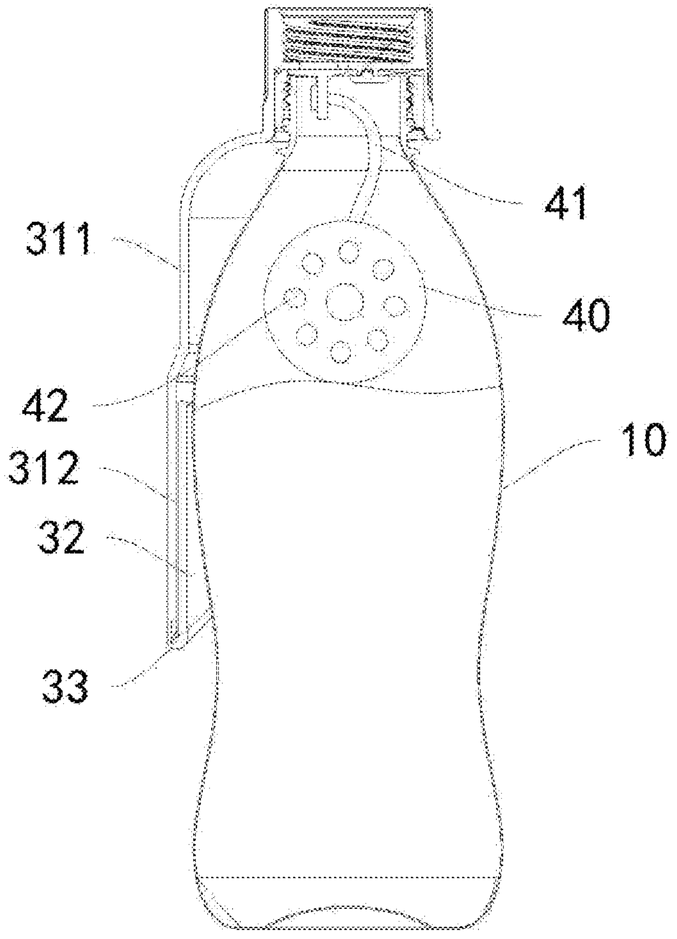
FIG. 8 is a front view structural diagram showing the storage state of a pet outdoor water dispenser and feeder according to another embodiment of the present disclosure.

In some possible embodiments, with reference to FIGS. 7 and 8, the movable sealing piece 25 is also connected to a licking ball 40. Specifically, the licking ball 40 is connected to the movable sealing piece 25 via a connecting rope 41. In this embodiment, due to its material properties, the movable sealing piece 25 can always cover the water outlet hole 24, requiring manual pulling of the movable sealing piece 25 to open the water outlet hole 24. This embodiment entices pets to lick or pull the licking ball 40, thereby pulling the movable sealing piece 25 to open the water outlet hole 24, allowing water to flow out of the bottle body 10. This design increases the enjoyment of pets drinking water. Moreover, using the pet outdoor water dispenser and feeder of the present disclosure, pets can be trained to drink and eat autonomously even outdoors. If a similar licking ball 40 is installed on the switches of home water dispensers or feeders, frequent training can be conducted even outdoors, accelerating the training process for pets to drink and eat autonomously.

In some possible embodiments, as shown in FIGS. 7 and 8, the licking ball 40 is divided into two detachably connected hemispheres, which can be connected using a threaded structure. The licking ball 40 is of a hollow structure and is provided with a cavity for holding food, and a surface of the licking ball 40 is provided with a through hole 42 that communicates with the cavity. In this embodiment, food can be placed inside the licking ball 40 to entice pets to actively lick or pull the licking ball 40, thereby training them to drink and eat autonomously.

Figure 9:
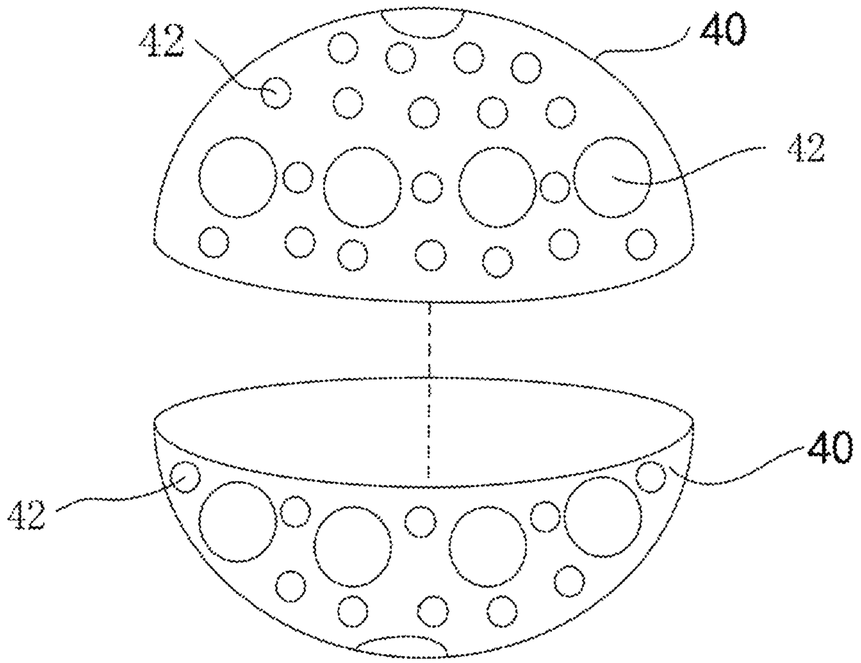
FIG. 9 is a structural diagram of a licking ball according to an embodiment of the present disclosure.

In some possible embodiments, as shown in FIG. 9, a plurality of protrusions are formed on the surface of the licking ball 40, aimed at enhancing the experience of pets licking or pulling the licking ball 40.

The above are only specific embodiments of the present disclosure, but the protection scope of the present disclosure is not limited thereto, and any changes or substitutions within the technical scope disclosed in the present disclosure shall fall within the protection scope of the present disclosure. Therefore, the protection scope of the present disclosure should be subject to the protection scope of the claims.

What is claimed is:

1. A pet outdoor water dispenser and feeder with double-ended threads, comprising:

a bottle body, wherein a bottle opening of the bottle body is provided with an outer thread;

a bottle cap, wherein the bottle cap comprises an upper cap and a lower cap, a partition plate is arranged between the upper cap and the lower cap, the partition plate is provided with a water outlet hole, the partition plate is provided with a movable sealing piece on one side of the upper cap, the movable sealing piece is used for opening or sealing the water outlet hole, and an inner thread is provided on an inner side of the upper cap and an inner side of the lower cap; and a bowl body, wherein the bowl body is fixedly connected to the upper cap, and the bowl body is used for collecting water flowing out from the water outlet hole in the bottle body; wherein the bowl body comprises a hard portion and a soft portion, a crease line is provided at a connection between the hard portion and the soft portion, and the soft portion is arranged to be folded along the crease line and is tightly attached to an inner surface of the hard portion;

the hard portion comprises a first water storage portion and a second water storage portion that communicate with each other, and an inner diameter of the second water storage portion is greater than an inner diameter of the first water storage portion.

2. The pet outdoor water dispenser and feeder with the double-ended threads according to claim 1, wherein the movable sealing piece is made of an elastic soft rubber material, one end of the movable sealing piece is fixedly connected to the partition plate, another end of the movable sealing piece is a free end, and the free end is biased to contact the partition plate and cover the water outlet hole.

3. The pet outdoor water dispenser and feeder with the double-ended threads according to claim 1, wherein the partition plate is provided with a protruding fixing block on one side of the upper cap, a mounting slot is formed between the fixing block and the partition plate, and one end of the movable sealing piece is fixedly inserted into the mounting slot.

4. The pet outdoor water dispenser and feeder with the double-ended threads according to claim 1, wherein the movable sealing piece is provided with a handle on one side of the upper cap.

5. The pet outdoor water dispenser and feeder with the double-ended threads according to claim 1, wherein a low-lying water collecting groove is formed on an inner side of the second water storage portion.

6. The pet outdoor water dispenser and feeder with the double-ended threads according to claim 1, further comprising a licking ball, the licking ball is connected to the movable sealing piece via a connecting rope, the licking ball is arranged to be placed in the bottle body or the bowl body, and pet licks or pulls the licking ball, thereby pulling the movable sealing piece to open the water outlet hole.

7. The pet outdoor water dispenser and feeder with the double-ended threads according to claim 6, wherein the licking ball is divided into two detachably connected hemispheres, the licking ball is provided with a cavity for holding food, and a surface of the licking ball is provided with a through hole that communicates with the cavity.

8. The pet outdoor water dispenser and feeder with the double-ended threads according to claim 6, wherein a plurality of protrusions are formed on the surface of the licking ball.

* * * * *